United States Patent [19]

Kawasaki et al.

[11] 4,305,849

[45] Dec. 15, 1981

[54] POLYOLEFIN COMPOSITION CONTAINING HIGH MOLECULAR WEIGHT POLYETHYLENE GLYCOL USEFUL FOR ELECTRICAL INSULATION

[75] Inventors: Youichi Kawasaki; Kenji Igarashi; Seiho Taniguchi, all of Yokohama, Japan

[73] Assignee: Nippon Unicar Company Limited, Tokyo, Japan

[21] Appl. No.: 178,406

[22] Filed: Aug. 15, 1980

[30] Foreign Application Priority Data

Aug. 16, 1979 [JP] Japan ................................ 54/104699

[51] Int. Cl.$^3$ ........................... H01B 3/18; H01B 3/20
[52] U.S. Cl. ............................. 252/567; 174/110 PM; 174/110 R; 174/110 SR; 174/110 A; 260/45.95 S
[58] Field of Search ............................... 252/63.2, 567; 174/110 PM, 110 R, 110 SR, 110 A; 260/45.95 S

[56] References Cited

U.S. PATENT DOCUMENTS 3,956,420  5/1976  Kato et al. ............. 260/45.8 NW X
4,013,622  3/1977  DeJuneas et al. ............ 260/45.95 S
4,206,260  6/1980  McMahon ............... 174/110 PM X

*Primary Examiner*—Mayer Weinblatt
*Attorney, Agent, or Firm*—L. Martin Flynn

[57] ABSTRACT

A polyolefin composition for electrical insulation which comprises polyolefin or crosslinked polyolefin and a small quantity of high-molecular weight polyethylene glycol. This composition is far less vulnerable to the deterioration that occurs as dendroid voids when employed as an electrical insulation of high-tension power cables which are operated under water. The polyethylene glycol has more than 44 carbon atoms and is used in an amount from 0.3 to 10 wt % based on polyolefin.

5 Claims, 3 Drawing Figures

POLYOLEFIN COMPOSITION CONTAINING HIGH MOLECULAR WEIGHT POLYETHYLENE GLYCOL USEFUL FOR ELECTRICAL INSULATION

BACKGROUND OF THE INVENTION

This invention relates to a polyolefin composition for electrical insulation which is far less vulnerable to the deterioration of insulation that occurs as dendroid voids (referred to as "water trees" hereunder) in polyolefin or crosslinked polyolefin employed as an electrical insulation, particularly for high-tension power cables which are operated under water.

It has been known that water trees grow from voids and foreign matters, such as metals, in electrical insulation made of polyolefin or crosslinked polyolefin composition when the insulation is subjected to a high voltage under water. In spite of continued efforts for improvement of the manufacturing process, the complete elimination of foreign matters and voids is still difficult to achieve.

As a means for preventing water trees, incorporation of a small quantity of strong electrolyte into polyolefin was proposed in Japanese Patent Publication No. 24938/1977. On the other hand, there is a strong theory that the presence of metal ions is a cause of water trees.

The idea of adding a voltage stabilizer or alcohol to polyolefin was proposed several times as a common countermeasure for water trees. For example, Japanese Patent Laid-open No. 16746/1978 teaches that the addition of monohydric higher alcohol having 6 to 24 carbon atoms is effective. However, such low-molecular weight alcohol is mobile through polyolefin molecules and blooms easily to the surface of the insulation as the power cable gets hot, with the result being that the bloomed alcohol evaporates and the effect of the alcohol is soon lost. Furthermore, Japanese Patents Laid-open Nos. 119937/1974, 40547/1977, 40553/1977, and 40554/1977 describe supplementarily the incorporation of a polyhydric alcohol into an electric insulation which is made resistant by adding as an indispensable ingredient a voltage stabilizer, such as ferrocene, dihydronaphthalene, dialkoxynaphthalene, phosphorane, and halogenated p-nitroaniline. These patents claim that the dielectric strength is further improved by the addition of a polyhydric alcohol, but they treat the polyhydric alcohol as a mere additive similar to dispersants, surfactants, unsaturated polymers, etc. However, the significance of adding a polyhydric alcohol is barely recognized in the examples, and the polyhydric alcohols mentioned in these patents broadly vary in their molecular weight. What is given great importance in these patents is not water trees which readily occur in an insulation placed under water, but rather the conventional treeing that is attributable to high voltage alone, not associated with the presence of water.

Another countermeasure for water treeing disclosed in Japanese Patent Laid-open No. 145799/1977 covers the addition of a large quantity of inorganic filler. In this patent, the addition of inorganic filler together with diethylene glycol was practiced in some examples. However, the reason why it was added is not described. Examples without diethylene glycol were rather superior to examples with this substance. Japanese Patent Laid-open No. 3700/1978 discloses the incorporation of a water tree inhibitor. The example of this patent illustrates a composition to which polyethylene glycol distearate is added in small quantities. However, the effect of this substance as a water tree inhibitor is just as mediocre as the effect of a metal salt of stearic acid. This laid-open patent enumerates fatty acid, fatty acid metal salt, fatty acid ester, etc. in the same category. This fact suggests that fatty acid is an indispensable moiety which must have a group that can catch water readily. Such a group, however, is not identified in the specification, and, needless to say, nothing is mentioned about polyethylene glycol.

Japanese Patent Laid-open No. 60346/1979 discloses a modifier which is very effective for a crosslinked polyethylene composition. Such a modifier should be a compound of less than 24 carbons containing in the molecule both a carboxyl group or its metal salt with a high affinity for foreign matters such as metals and a double bond that forms chemical bonding with the polyolefin.

After a series of experiments on the prevention of water treeing, it was concluded that, contrary to the conventional teachings, a small quantity of high-molecular weight polyethylene glycol is all that is required, and no voltage stabilizer nor carboxylic acid or its salt is necessary. As pointed out before, the prior art teaches the use of ethylene glycol or diethylene glycol as an adjuvant for a voltage stabilizer. Other prior art discloses polyethylene glycol end-blocked by stearic acid as a water tree inhibitor. What differentiates the present invention from the prior art is that the problem can be solved simply by adding a small quantity of high-molecular weight polyethylene glycol, which is one of the cheapest compounds, to polyolefin.

One of the above-mentioned items of prior art maintains that a polyhydric alcohol is effective secondarily. In this prior art, however, polyethylene glycol is treated as the same category as monomeric ethylene glycol, propylene glycol, butane diol, etc. and alicyclic and aromatic polyhydroxyl compounds. In contrast with these teachings, the present invention discloses that only high-molecular weight polyethylene glycol is effective and polypropylene glycol is not. Accordingly, it is believed that high-molecular weight polyethylene glycol is quite different in its functional mechanism from polyhydric alcohols which have heretofore been used secondarily in combination with a voltage stabilizer and the like.

SUMMARY OF THE INVENTION

This invention relates to a polyolefin composition for electrical insulation which comprises polyolefin or crosslinked polyolefin and a small quantity of high-molecular weight polyethylene glycol. This composition is far less vulnerable to the deterioration that occurs as dendroid voids when employed as an electrical insulation of high-tension power cables which are operated under water. The polyethylene glycol has more than 44 carbon atoms and is used in an amount of from 0.3 to 10 wt%, based on the polyolefin or crosslinked polyolefin.

DETAILED DESCRIPTION OF THE INVENTION

Figure 1:
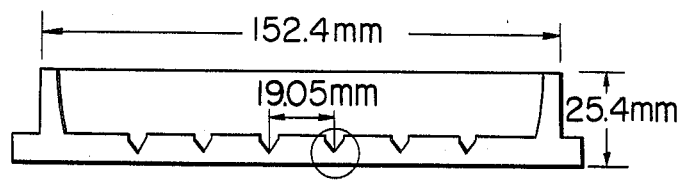
FIG. 1 is a view of the test specimen.
Figure 1:
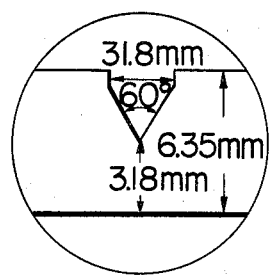
Figure 2:
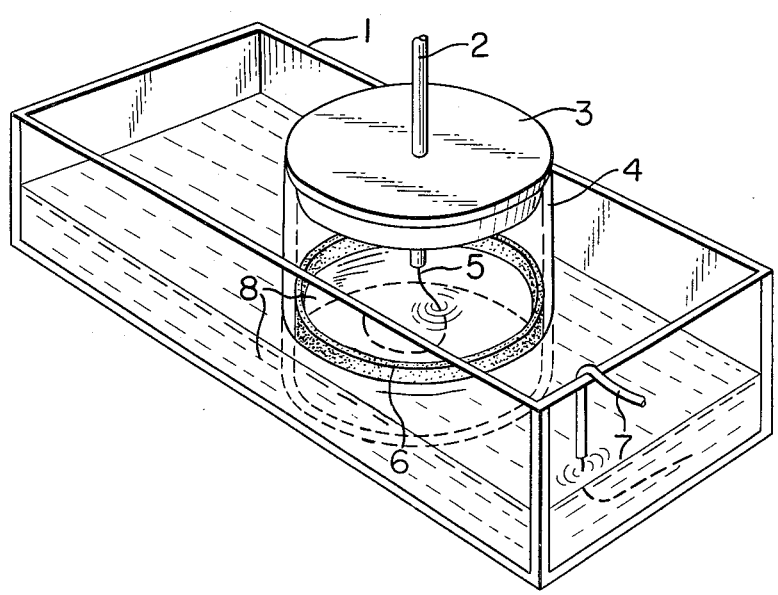
FIG. 2 is a perspective view of the test apparatus.

The composition according to this invention is especially effective for preventing water trees which appear in an insulation immersed in water when deterioration takes place under high-tension. (Water trees are different from common electric trees not only in appearance, but also in the fact that the former occur only when a high-tension is applied to an insulation under water). The composition of this invention will find applications in electrical insulating materials to be used under water. Such applications include power cable insulation, insulating tape for cable splicing, and other electric and electronic parts which might be exposed to water or water vapor.

We will discuss how water trees are different from electric trees which have so far been termed simply "trees", and chemical trees which occur under specific environments. Water trees occur when an organic polymeric insulating material like a polyolefin is subjected to an electric field under water for a long time. Water trees were named from their dendroid configuration they usually assume. Actually, they are fine cavities or voids, which look white when filled with water but which are almost invisible when dry. Therefore, specimens should be boiled in water or dyed for observation of water trees. On the other hand, electric trees which are referred to conventionally as "trees" grow and propagate along the path of electric discharge, leaving carbonized resin therein. This is the reason why they usually look black. Meanwhile, chemical trees stem from copper sulfide and copper oxide which are formed on a copper conductor by reaction of copper with hydrogen sulfide and other reactive gases which have diffused to copper conductor through the resin insulation. These reaction products grow into black or reddish brown needle crystals that look like trees. Chemical trees are characterized by the fact that they occur even under tension-free conditions.

The polyolefin used in this invention includes polyethylene, polypropylene, ethylene-propylene copolymers, polybutene, polyisobutylene, poly-4-methylpentene, copolymers thereof, and crosslinked products thereof. High-molecular weight polyethylene glycol means polyethylene glycol having more than 44 carbon atoms, preferably more than 80 carbon atoms. The polyethylene glycol is incorporated in an amount of 0.3 to 10% by weight, based on the polyolefin or crosslinked polyolefin. Under 0.3%, no satisfactory effect is attained, particularly in the case where polyethylene glycol of relatively low molecular weight is employed. On the other hand, when over 10% is used, some difficulties are encountered in achieving uniform compounding without slight discoloration in the resulting composition, although the inexpensive polyethylene glycol has no economic limitation in the quantity to be added.

Whether or not the polyolefin is crosslinked does not matter in this invention, and the use of stabilizers, inorganic fillers, and other additives is within the scope of this invention.

EXAMPLES

The polyolefin used as the major constituent of the composition was selected from low-density polyethylene and ethylene-vinyl acetate copolymer which are most popular as electrical insulating materials. High-molecular weight polyethylene glycol which characterizes this invention was selected from a series ranging from 1,000 to 20,000 in the molecular weight. It was confirmed that the present invention can be practiced for polyolefin with or without crosslinking. The results obtained are shown in Table 1. Also shown in Table 1, for comparison, are the results of Comparative Examples that follow.

Comparative Example 1 employed no polyethylene glycol and water trees were observed at all the measuring points. In Comparative Example 2, 0.25 parts by weight of polyethylene glycol having a molecular weight of 1000 was incorporated into 100 parts by weight of polyethylene. Water trees were observed at 25% of the measuring points.

In Example 1, the occurrence of water trees was reduced to zero by adding 0.5 parts by weight of polyethylene glycol having a molecular weight of 1000 to 100 parts by weight of crosslinked polyethylene. Good results were also obtained in Example 2, in which the major constituent was thermoplastic polyethylene. Example 3 to 6 were intended to determine how the molecular weight and quantity of polyethylene glycol affect the occurrence of water trees. It was found that the higher the molecular weight and the larger the quantity added, the better the results, although the effect levels off beyond 0.5%.

Test methods employed in the Examples are as follows:

(1) Preparation of test specimens: Tray-shaped specimens, each having twelve inverted conical holes on the bottom, were compression-molded from polyolefin compositions into which specified quantities of polyethylene glycol had been incorporated by kneading. The section and dimensions of the specimen are shown in FIG. 1.

(2) Test apparatus: The tray-shaped specimen was filled with 0.01 N sodium chloride solution, and the bottom of the specimen was placed in 0.01 N sodium chloride solution. Voltage (as specified below) was applied to the saline solutions inside and outside the specimen through platinum wires. The perspective view of the apparatus is shown in FIIG. 2, wherein 1 is a transparent test veseel, 2 is a wire leading to high voltage power source, 3 is a polyethylene lid, 4 is a transparent container, 5 is a platinum wire electrode, 6 is a specimen, 7 is an earthing wire, and 8 is an electrolyte.

Figure 3:
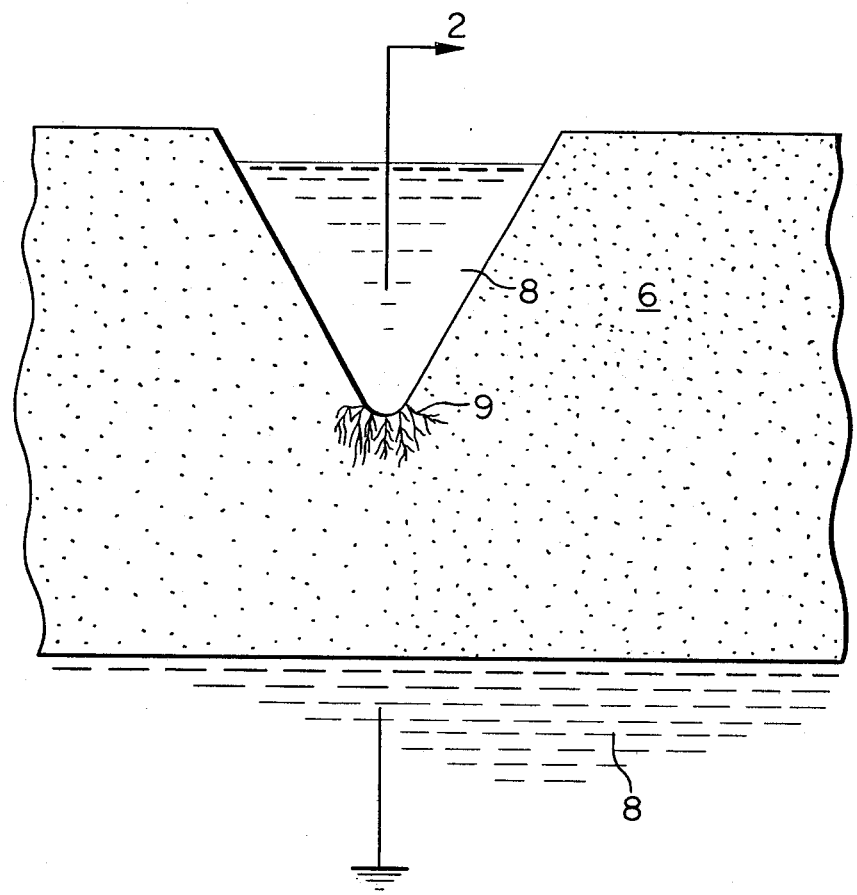
FIG. 3 is an enlarged view of a water tree in a test specimen.

(3) Occurrence and observation of trees: The presence or absence of water trees that had grown from the apex of the inverted conical hole in the specimen after application of an alternating voltage, 5 kV and 5 kV, for 48 hours, was examined and the length of the tree was measured using an optical microscope. In order to facilitate observation, the specimen was sliced into thin chips near the apex of the inverted conical hole along the conical axis, and the sliced chips were dyed by boiling in a methylene blue aqueous solution. FIG. 3 schematically shows an enlarged view of a water tree.

TABLE 1

| | Comparative Example | | Example | | | | | | | Comparative Example |
|---|---|---|---|---|---|---|---|---|---|---|
| | 1 | 2 | 1 | 2 | 3 | 4 | 5 | 6 | | 3 |
| Polyethylene (MI: 2, d: 0.92) | 100 | 100 | 100 | 100 | 100 | 100 | 100 | 100 | — | 100 |
| EVA Copolymer (MI: 2.5, d: 0.94) | — | — | — | — | — | — | — | — | 100 | — |
| Polyethylene glycol | | | | | | | | | | |
| (mol wt: 1000) | — | 0.25 | 0.5 | 0.5 | — | — | — | — | — | 10 |
| (mol wt: 6000) | — | — | — | — | 1.0 | — | — | 1.0 | — | — |
| (mol wt: 20000) | — | — | — | — | — | 0.5 | 1.0 | — | — | — |
| 4,4'-thiobis (6-t-butyl-m-cresol) | 0.2 | 0.2 | 0.2 | 0.1 | 0.2 | 0.2 | 0.1 | 0.2 | 0.2 | 0.2 |
| Dicumyl peroxide | 2.0 | 2.0 | 2.0 | — | 2.0 | 2.0 | — | 2.0 | 2.0 | 2.0 |
| No. of water trees* | 12 | 3 | 0 | 0 | 0 | 0 | 0 | 0 | 0 | 0 |
| Average length of water tree (μm) | 105 | 30 | — | — | — | — | — | — | — | — |
| Remarks | — | — | — | — | — | — | — | — | — | ** |

Note:
*No. of inverse conical holes from which water trees grew, out of twelve holes.
**Discolored

What is claimed is:

1. An electrical insulation composition, comprising: an organic polymeric electrical insulating material selected from the group consisting of polyolefin and crosslinked polyolefin, said insulating material containing blended therein from 0.3 to 10% by weight, based on the weight of said insulating material, of high molecular weight polyethylene glycol having more than 44 carbon atoms in the molecule.

2. An electrical insulation composition as claimed in claim 1 in which said high molecular weight polyethylene glycol contains more than 80 carbon atoms in the molecule.

3. An electrical insulation composition as claimed in claim 1 in which said high molecular weight polyethylene glycol has a molecular weight of from 1,000 to 20,000.

4. An electrical insulation composition as claimed in claim 1 consisting essentially of said insulating material and said polyethylene glycol.

5. An electrical insulation composition as claimed in claim 4 containing from 0.5 to 1.0% by weight of said high molecular weight polyethylene glycol.

* * * * *

UNITED STATES PATENT AND TRADEMARK OFFICE
CERTIFICATE OF CORRECTION

PATENT NO. : 4,305,849
DATED : December 15, 1981
INVENTOR(S) : Youichi Kawasaki et al It is certified that error appears in the above—identified patent and that said Letters Patent is hereby corrected as shown below:

Column 4, lines 29-30; "Example" should read --Examples--.

Column 4, line 51; "FIIG." should read --FIG.--.

Column 4, line 52; "veseel" should read --vessel--.

Column 4, line 61; second appearing "5 kV" should read --5 kHz--.

Signed and Sealed this

Twenty-seventh Day of July 1982

[SEAL]

Attest:

Attesting Officer

GERALD J. MOSSINGHOFF

Commissioner of Patents and Trademarks